June 13, 1933.    J. S. DRUMMOND    1,913,873
CARRIER
Filed Aug. 24, 1931    2 Sheets-Sheet 1

INVENTOR.
James S. Drummond
BY
Harry Schroeder
ATTORNEYS.

June 13, 1933.   J. S. DRUMMOND   1,913,873
CARRIER
Filed Aug. 24, 1931   2 Sheets-Sheet 2

INVENTOR.
James S. Drummond
BY
Harry C. Schroeder
ATTORNEYS.

Patented June 13, 1933

1,913,873

UNITED STATES PATENT OFFICE

JAMES S. DRUMMOND, OF SAN LEANDRO, CALIFORNIA

CARRIER

Application filed August 24, 1931. Serial No. 559,004.

This invention is a carrier and distributor and has special reference to a device to be used for leveling, transporting and distributing earth, sand and other loose material.

The main object of the invention is to provide a device of the follower type, which may be attached to and drawn by a tractor or similar device, and which will be self-loading and self-unloading, and which will operate in ordinary or loose earth.

Another object of the invention is to provide a device as outlined, which when connected to a tractive device and a source of power, will load itself and on which the load may be transported to a remote point, and there evenly distributed.

A further object of the invention is to provide a device as outlined with caterpillar running gear to give broad distribution to the load.

Other objects and advantages of the invention will become apparent as the following description is read on the drawings forming a part of this specification and in which similar reference characters are used to designate similar parts throughout the several views and in which.

Figure 1:
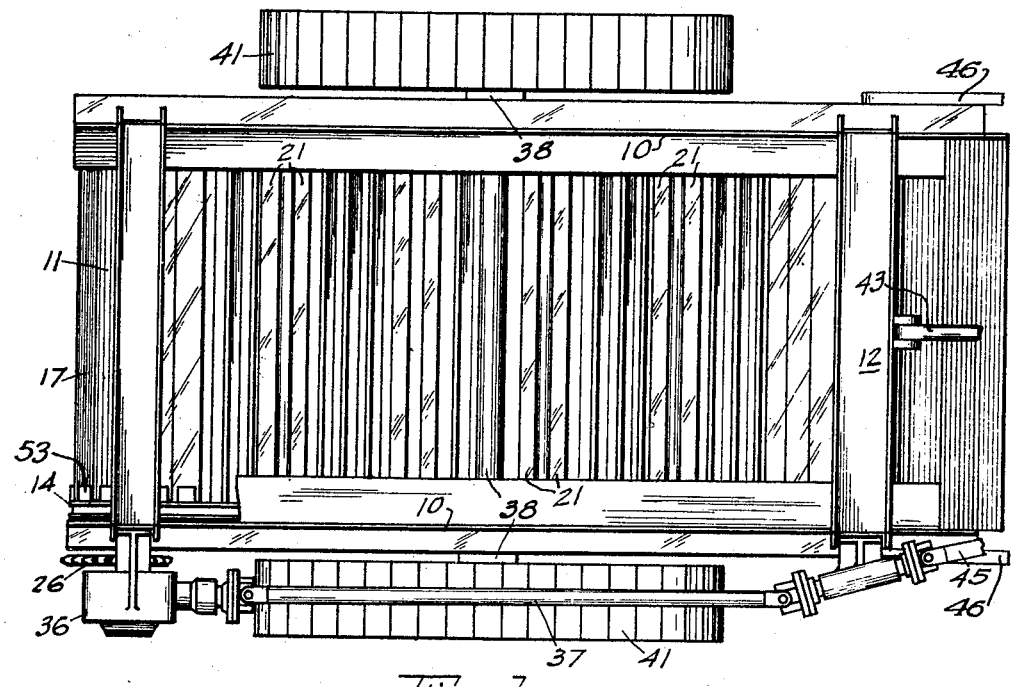
Fig. 1 is a top plan view of the invention.
Figure 2:
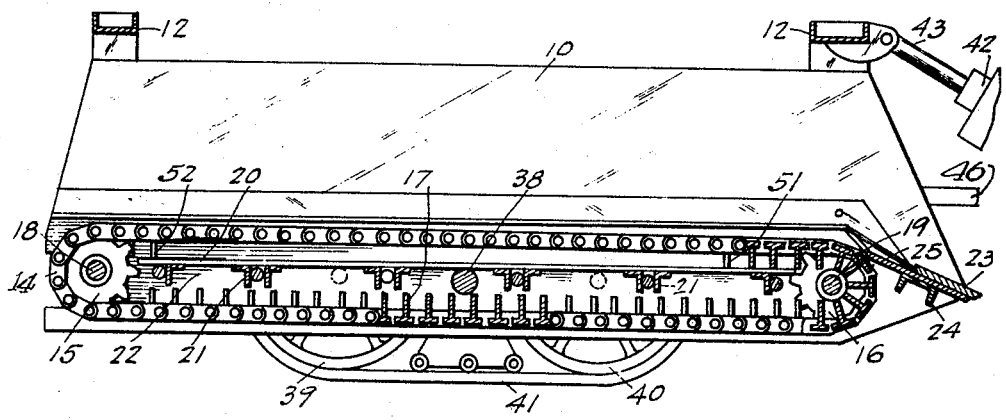
Fig. 2 is a longitudinal sectional elevation through the invention.
Figure 5:
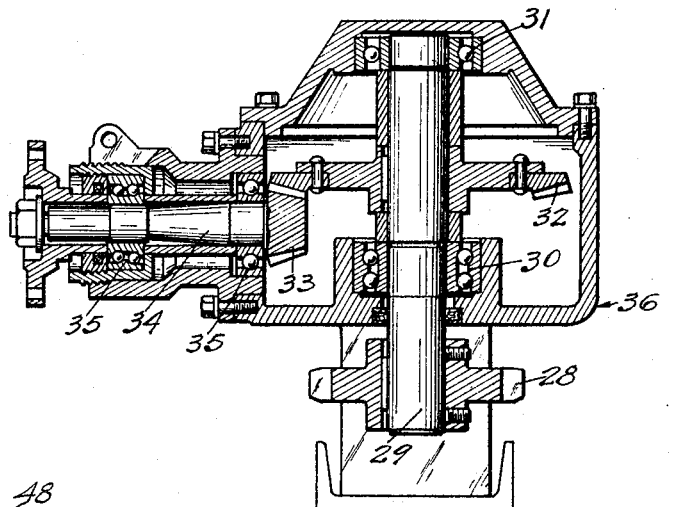
Fig. 5 is a fragmentary view showing the tongue and tipping means.
Figure 4:
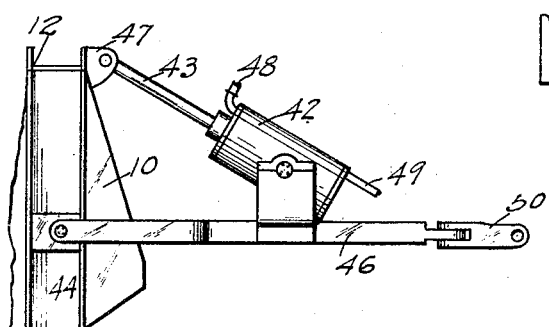
Fig. 4 is a sectional view through the drive box for the conveyor.
Figure 3:
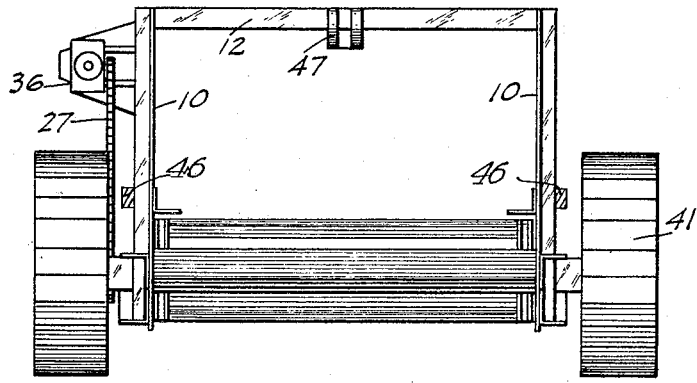
Fig. 3 is an end view showing the loading end of the invention with the draw bar shown in section.
Figure 6:
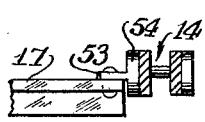
Fig. 6 is a fragmentary view showing the method of attaching the T bars to the chains.

The invention consists of an open end body having sides 10 and a conveyor bottom 11. The sides are suitably tied together by means of cross-members 12.

The conveyor consists of a pair of conveyor chains 14 running over sprockets 15 and 16 and being spanned by T bars 17 throughout a portion of its length and which are secured to integral ears 53 on the inside links 54 of the chains 14, forming a continuous bottom when in one position. Sprockets 15 and 16 are mounted on shafts 18, and 19, shaft 19 being an idle shaft while shaft 18 is driven from a remote point, these shafts being suitably mounted in bearings mounted on the body. A track 20 provides a continuous support for the conveyor, this track being supported by cross-members 21 which are supported between the longitudinal beams 22, which in turn are secured to the sides 10.

At the forward end of the body, in front of the conveyor is a cutter blade or scoop 23 which is adapted to cut into and scoop up the loose earth, this cutter being suitably supported on the plate 25 and cross-member 24.

The drive means for the conveyor consists of a sprocket 26 secured on a shaft 18 and driven by a chain 27 cooperating with a sprocket 28 which is mounted on a shaft 29, this shaft being rotatably mounted in ball bearings 30 and 31. Secured on shaft 29 is a bevel gear 32 which meshes with a bevel pinion 33 which is secured on or integral with a shaft 34. Shaft 34 is suitably mounted in ball bearings 35, the entire mechanism being suitably mounted in a housing 36 which is adjustably secured to the side of the body.

A suitable shaft extension 37 is connected to shaft 34 and coupled to a power take-off, such as that covered in my copending application Serial No. 558,501, filed August 21, 1931 or other suitable driving means.

The body is mounted on a shaft 38 which is centrally pivoted between the track wheels 39 and 40, in suitable framing, the tracks 41 providing a large supporting area for the carrier and its load.

The device is drawn by a tractor and actuated by means of a hydraulic cylinder 42, which is pivotally secured at the forward end to the tongue 46, and has the piston rod 43 pivotally connected to the cross-member 12 by a bracket 47, suitable oil connections being provided at 48 and 49.

The piston is actuated by means of a suitable pump with flow reversing means such as that covered by my copending application Serial No. 559,005 filed August 24, 1931 and by means of which the piston is positively retained in any desired position.

The device is operated as follows; A yoke tongue 46 connected to the sides as at 44 is pivotally connected to the drawbar of a tractor by means of the coupling or clevis 50, the shaft 45 is connected to a power take-off on the tractor and the cylinder 42 is connected in circuit with an oil pump through pipes 48 and 49.

By forcing the piston forward, the body is tipped at the front end, the scoop 23 engaging the earth and being drawn forward by the tractor, a deposit of earth is made at the end of the conveyor.

The conveyor is operated through the shaft 45 and 37 and the earth is carried backward as it is loaded until the entire top surface of the conveyor is loaded.

The carrier is then righted by means of the hydraulic cylinder 42, the carrier being retained in horizontal position and drawn to the point or place of distribution, at which point the conveyor is again put into operation, gradually feeding the earth off either end, and giving uniform distribution thereto.

By unloading from the forward end and adjusting the front end to the desired height, the blade 23 performs the function of a leveler, and a level bed is thereby secured.

It will be noted that the conveyor is self-cleaning, as the juxtaposed spanning elements or T bars extend only throughout a portion of the length of the conveyor, the remaining portion of the length having no spanning elements causing the conveyor to dump any material therebetweeen and preventing accumulation between the upper and lower strands, T bars extending only from the point 51 to point 52, and being substantially thin at their juxtaposed edges to prevent gripping of dirt therebetween.

Having described an operable method of constructing and using the invention, it will be understood that variations in construction and arrangement of parts which are consistent with the appended claims may be resorted to without detracting from the spirit or scope of the invention or sacrificing any of the advantages thereof.

I claim:

In combination with a dirt carrier, a self-cleaning conveyor consisting of two spaced apart chains provided with juxtaposed spanning elements throughout a portion of the length thereof to form a floor, the remaining portion having no spanning elements whereby accumulation of dirt within the conveyor is obviated, the spanning elements being substantially thin at their juxtaposed edges to prevent gripping of dirt therebetween and having each a centrally disposed, depending reinforcing member.

In testimony whereof I affix my signature.

JAMES S. DRUMMOND.